United States Patent
Marsland

(10) Patent No.: US 6,823,291 B2
(45) Date of Patent: Nov. 23, 2004

(54) REMOTE MONITORING

(75) Inventor: Christopher John Marsland, Wirral (GB)

(73) Assignee: Combined Power Limited, Salford (GB)

( * ) Notice: Subject to any disclaimer, the term of this patent is extended or adjusted under 35 U.S.C. 154(b) by 0 days.

(21) Appl. No.: 10/203,959

(22) PCT Filed: Feb. 16, 2001

(86) PCT No.: PCT/GB01/00633
§ 371 (c)(1),
(2), (4) Date: Oct. 15, 2002

(87) PCT Pub. No.: WO01/61665
PCT Pub. Date: Aug. 23, 2001

(65) Prior Publication Data
US 2003/0079012 A1 Apr. 24, 2003

(30) Foreign Application Priority Data
Feb. 17, 2000 (GB) .............................. 0003570

(51) Int. Cl.⁷ .............................................. G06F 11/32
(52) U.S. Cl. ........................................ 702/188; 702/35
(58) Field of Search ....................... 702/188, 182–185, 702/189, 35–37

(56) References Cited

U.S. PATENT DOCUMENTS

| | | | | |
|---|---|---|---|---|
| 4,835,671 A | * | 5/1989 | Sato et al. ................... 700/81 |
| 5,123,017 A | * | 6/1992 | Simpkins et al. ............. 714/26 |
| 5,887,216 A | * | 3/1999 | Motoyama ..................... 399/8 |
| 6,274,941 B1 | * | 8/2001 | Ryhiner .................... 290/40 A |
| 6,553,336 B1 | * | 4/2003 | Johnson et al. ............. 702/188 |
| 6,591,296 B1 | * | 7/2003 | Ghanime ..................... 709/224 |
| 6,654,673 B2 | * | 11/2003 | O'Neal et al. ................ 701/33 |

FOREIGN PATENT DOCUMENTS

| | | |
|---|---|---|
| EP | 0822473 | 7/1997 |
| EP | 0965897 | 12/1999 |
| GB | 2206708 | 1/1989 |
| WO | 9919782 | 4/1999 |
| WO | 9963409 | 12/1999 |

* cited by examiner

Primary Examiner—Marc S. Hoff
Assistant Examiner—Edward Raymond
(74) Attorney, Agent, or Firm—Koppel, Jacobs, Patrick & Heybl

(57) ABSTRACT

A monitoring system for combined heat and power (CHP) units (1) has a main monitoring computer (2) at a remote central location connected to the CHP units (3). Data is processed and energy management information, as well as repair and maintenance procedures, can be derived by the remote and local computers (2, 3). Energy management information can also be obtained locally by means of a PC connected by a dial-up or network link (7) to a data access device (4b) of the local computer (3).

5 Claims, 1 Drawing Sheet

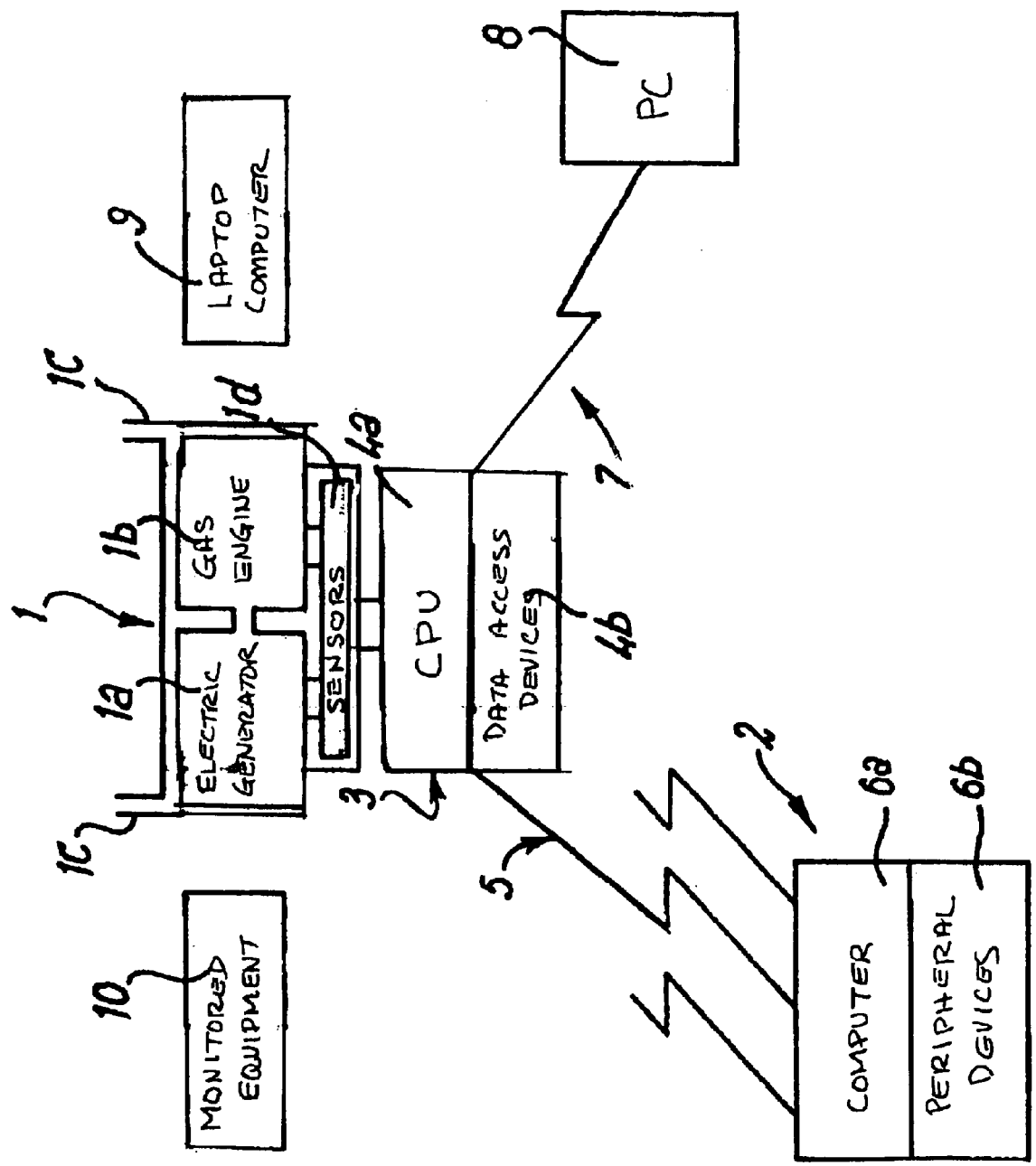

REMOTE MONITORING

This application claims benefit of PCT/GB01/00633 filed Feb. 16, 2001 published as WO 01/61665 which claims benefit of GB 01/00633 filed Feb. 17, 2000.

TECHNICAL FIELD

This invention relates to monitoring of power equipment, particularly although not exclusively so called combined heat and power (CHP) units, for energy management purposes.

BACKGROUND ART

CHP units are widely used in premises to facilitate efficient supply of heat and power. Fuel is burnt within the unit to generate electric power, as a sole or fall back or supplementary supply for the premises, and excess heat from the unit is recovered typically for use by a local hot water or central heating system.

In prior patent GB 2206708B a system is described for remote monitoring of the performance of CHP units at different locations. Operational data is collected in the vicinity of each CHP unit by means of local computing equipment linked to sensors. This data is stored and processed in the local computer equipment and is periodically uploaded to a remote central monitoring computer. As described in the patent, the local computer equipment can respond to faults and seek to remedy these automatically, for example by repeating a failed start-up procedure. In the event that the local computer equipment is unable to remedy the fault, an alarm message can be sent automatically to the central monitoring computer to summon assistance.

At the central monitoring computer information is available as to the performance of all CHP units which are monitored by the computer, and it is possible to view a screen display or obtain a print out showing information such as start failures, component temperatures, power generation voltage and current etc, related to factors such as time, location, history, type of CHP unit, etc. Statistical analysis of collected data, efficiency of operation, maintenance and service requirements, performance trends and the like can be computed and also displayed or printed out.

This central monitoring procedure facilitates diagnosis of problems and preventive maintenance analysis, as well as response to failures. Thus, personnel at the central monitoring location can, for example, be alerted to component overheating or other data signifying possible fall in efficiency or likely future failure so that a decision can be taken as to when and how to change the component or take other remedial action.

This procedure is however in practice confined to the central monitoring location and collected information is not readily accessible e.g. to individual users or owners of the CHP units. Such users or owners are not therefore able readily to participate in maintenance, performance improvement and general energy management of their units.

DISCLOSURE OF INVENTION

An object of the present invention is to facilitate access to information collected from monitored power equipment for energy management purposes.

According to the invention therefore there is provided a power equipment monitoring system for monitoring performance data of individual power equipment units, said system comprising sensors associated with each said unit, a data collection and processing device local to each said unit adapted to receive and process data from the respective sensors, monitoring equipment adapted to receive data from each data collection and processing device for fault and maintenance monitoring purposes, characterised by the provision of a data access device associated with each data collection and processing device, said device being accessible remotely to provide a display, using a remote computer, of data from a selected said data collection and processing device.

With this arrangement, a user or other person authorised in relation to monitored power equipment can readily access data from that equipment. Such person can therefore monitor or utilise such data himself without requiring the assistance of other personnel e.g. at the location of a central said monitoring equipment.

The involvement of the person may be confined to accessing data. Alternatively, the person may also be able to give instructions to influence performance of the power equipment.

Most preferably, there is a respective data access device for each data collection and processing device and preferably also the data access device is disposed locally to the data collection and processing device.

Preferably the data access device is arranged to store data from the data collection and processing device in a format which can be utilised to generate the said display at the remote computer using an Internet web browser. Thus, for example, the data may be stored in HTML code, and communication between the remote computer and the data access device may utilise TCP/IP protocol. Alternatively other formats and codes such as XML and WAP may be used, and correspondingly the display may be produced and formatted in any suitable manner using text and/or graphics on a VDU or other screen with web browser or WAP or other technology including SMS text messaging.

Communication between the remote computer and the data access device may be effected in any suitable manner. Thus, the communication may occur via a direct dial-up telephone and modem, or ISDN linkage, or via the Internet or otherwise. In one embodiment a direct dial-up linkage is used. In an alternative embodiment a permanent network connection e.g. via an intranet and/or via a permanent internet connection is used, the local device having its own IP address.

Preferably access to the data access device is security protected, suitably by the use of passwords. There may be different levels of access which may be protected by different passwords. The levels may correspond to different ranges of data and/or to different levels of interaction. Highest levels of access may be restricted to maintenance engineers or other personnel authorised for extensive or full access.

The data access device may incorporate a dongle or like component which is monitored and has to be present for proper operation. This component may determine the available level of access and may be capable of modification by an authorised person, e.g. supervisor or engineer, to change the level of access.

With regard to the fault and maintenance monitoring equipment, this may comprise central monitoring equipment at a central location remote from the power equipment units and connected thereto by remote linkage. The central monitoring equipment may respond to fault reports, e.g. to arrange for an engineer to attend, and/or the equipment may analyse maintenance and repair parameters such as to indicate a servicing requirement and/or a component replacement or the like, e.g. as described in patent GB 2206708B.

Messages, such as emergency messages to an engineer to attend a breakdown, may be initiated by the system and transmitted in any suitable manner. In one embodiment messages can be sent to an engineer's mobile phone e.g. via SMS text.

The remote linkage between the central monitoring equipment and the power equipment units may be via dial-up telephone such that routine data is collected periodically, say every night, and failure requiring assistance is notified as and when it occurs. As an alternative to a telephone link, communication via Internet or e-mail may be used. Conveniently any failure message may be accompanied by transfer of operational data e.g. the last ten minutes of data, to assist with fault analysis. As an alternative to dial-up or other periodic connection there may be a permanent network connection such as an intranet or permanent internet connection. With such a permanent connection there may be data transfer on a periodic or continuous or on-demand basis.

The central monitoring equipment may be at any convenient location which may be in the same building as the power equipment units or elsewhere in the world. It is also possible to have a plurality of monitoring equipment devices at different locations operating independently or together e.g. operating as a network which may have a central server or overall control monitoring equipment.

As described in the above mentioned patent, data analysis and problem solving may occur locally to each power equipment unit. As described in the patent, this may be of a limited nature whereby for example after an attempted re-start of the power equipment unit has failed assistance is then summoned via the remote linkage to the central monitoring equipment.

In one embodiment of the present invention, this local data analysis and problem solving may be of a more extensive nature and even may be such that most or all of such analysis and problem solving occurs locally whereby there is respective monitoring equipment for each power equipment unit. In the latter case the monitoring equipment may be incorporated with the respective data access device and/or the respective data collection and processing device.

It is visualised that the invention will find particular application in the context of power equipment units which are CHP units. However, the invention is not restricted to such units. The invention may also find application in the context of monitoring other units which produce or consume or are operated by power, such as heating, venting, air conditioning, lighting or chilling units alternative or additional to CHP or other power generating units. Data from these other units may be collected via the said local data collection and processing device of a CHP or other unit, to be supplied to the said monitoring equipment, or the data may be routed thereto separately via independent sensors and local data collection devices.

BRIEF DESCRIPTION OF DRAWINGS

The invention will now be described further by way of example only and with reference to the accompanying DRAWING which is a schematic diagram of one form of a monitoring system according to the invention.

BEST MODE OF CARRYING OUT THE INVENTION

The system is used with multiple CHP units 1 which may be provided in premises, such as office blocks, hospitals, etc, at different locations.

The system has central monitoring equipment 2, at a convenient central monitoring location. This could be within the same premises or externally of the premises at any convenient location elsewhere in the world. The equipment 2 may be independent or may be part of a network of such equipment devices 2 e.g. whereby multiple regional equipment devices 2 are connected to each other and/or to a central master server.

Each CHP unit 1 has an electric generator 1a driven by a gas engine 1b. Heat is recovered from the unit via circulated water through a system 1c which feeds into a hot water or central heating system of the building (not shown). Electric power is derived from the generator 1a for use within the premises.

The CHP unit 1 has multiple sensors or instruments 1d which derive performance data relating for example to temperature of different components and parts of the unit, pressures, voltages, current, etc. Reference is made to patent GB 2206708B for further details.

The sensors 1d are connected to a local computer 3 having a local processing unit 4a mounted on or adjacent the unit 1. This computer 3 receives and processes the data from the sensors 1d such that the data is logged, in relation to real time, on a continuous or predetermined intermittent basis as desired.

The computer 3 processes the data such that any potential or actual failure is noted. Thus, for example, any temperature increase beyond a predetermined acceptable level indicating dangerous overheating is noted; and any failure of the unit to start is noted.

The computer 3 may take limited remedial action in relation to noted failures, for example by shutting down an overheating unit, or by attempting to re-start the unit after an initial failure to start.

Data concerning any such remedial action or other events is also stored in the computer 3.

The computer 3 incorporates a data access device 4b. This device receives the data stored in the computer 3 and converts this to a web page format e.g. using HTML code or any other suitable code depending on the intended mode of transmission and usage of the data.

The computer 3 and the data access device 4b are connected to a telephone line 5 (or cellular or other telephone linkage).

The computer 3 incorporates Internet (e-mail) software and at predetermined intervals, say every 24 hours, at night time, an e-mail is sent to a central monitoring address (discussed further hereinafter) containing all of the data stored over the preceding 24 hour period. As an alternative to connection at intervals, the computer 3 may be connected permanently to the central monitoring address e.g. by intranet or permanent internet connection, data being collected periodically or continuously or on demand e.g. following an error or significant change in monitored parameter or the like.

In the event that a failure occurs requiring urgent assistance, for example where the unit 1 has been shut down and will not re-start, an e-mail is sent containing an 'SOS' message immediately. This may be accompanied by back-up data such as the last ten minutes of logged data to assist with interpretation of the failure.

At the central location, the monitoring equipment 2 includes a computer 6a and associated peripheral devices 6b (printer, VDU, etc). The computer 6a has an Internet (e-mail) connection and is arranged to receive e-mail messages from the units as mentioned above.

The central monitoring equipment 2 processes the received messages to produce maintenance analysis data and recommendations such as servicing schedules and also responds to any SOS messages e.g. by directing attendance of an engineer. It is also possible for the equipment 2 to send instructions, e.g. by e-mail, back to the computer 3 to initiate adjustment or remedial action. Messages to an engineer may be by way of SMS messaging transmitted to the engineer's phone.

Each local computer 3 also has a telephone connection which permits direct dial-up linkage 7 with a remote PC 8 using a modem. With this, an authorised person can dial-up and access the data which is stored in web page format in the data access device 4b. To achieve this conventional TCP/IP communications software is utilised on the PC 8 with a web browser such as Internet Explorer or Netscape Navigator. Alternatively, the PC 8 may be connected to the computer 3 via a permanent intranet or network connection within the premises or via a permanent internet connection, the computer 3 having a unique IP address for identification purposes.

Access to the web page data is password protected and the authorised person is allowed access only after the appropriate user name and password have been supplied. Provision may also be made for Caller Line Identification whereby access is only permitted where a call is made from an authorised number.

Thus, the web page data pertaining to a particular CHP unit 1 can only be accessed by a person authorised in relation to that unit, and such person is not able to access data from other units.

Access may be at different levels depending on the level of authorisation. There may therefore be several passwords for each unit giving different levels of access. The access may, for example, relate to:
a) simple monitoring of data;
b) more detailed data;
c) simple control and monitoring;
d) full control and monitoring.

With higher levels c) and d) instructions can be sent to the computer 3 to modify or remedy operational performance.

Lower levels may be made available for remote access by a user or owner of the CHP unit, whereas higher levels may be reserved for local access by an authorised engineer. In the latter respect there may be a local connection to the computer 3 into which an engineer can plug a laptop 9 or other device for local communication purposes.

A computer board controlling the local computer may be protected from unauthorised copying or removal and reuse by a dongle. This may take the form of a unique electronic key which plugs into the board. The board interrogates the key at frequent intervals and stops the unit if it does not receive a correct response. The key can be remotely altered by the maintenance computer to allow different levels of functionality from the board.

With the arrangement described above an authorised user or owner of a CHP unit 1 can gain ready access to performance data of the unit using a standard PC and modem with conventional web browser Internet software, although communication may be by direct dial-up rather than through the Internet. This enables the authorised person to monitor performance of his unit himself.

The arrangement described also provides a convenient means for monitoring other energy management data e.g. relating to other equipment within the premises such as air conditioning, etc. This other equipment 10 can be connected to the computer 3 of the CHP unit 1 in like manner to the sensors 1d whereby data from the equipment 10 is routed to the device 4, and the central monitor 2, and information in relation to monitored parameters of the equipment 10 is made available at the PC 8. Alternatively, the equipment 10 may be connected through a different route to the central monitor e.g. through its own independent local routing computer, information being still made available via the PC 8 in relation to the equipment 10.

It is of course to be understood that the invention is not intended to be restricted to the details of the above embodiment which are described by way of example only.

Thus, for example, additionally or alternatively to the remote connection with the central monitoring equipment, there may be a level of processing performed by the local computer which permits local storage of history data and local performance of preventative maintenance analysis.

What is claimed is:

1. A power equipment monitoring system for monitoring performance data of individual power equipment units, said system comprising sensors (1d) associated with each said unit (1), a data collection and processing device (4a) local to each said unit adapted to receive and process data from the respective sensors, monitoring equipment (2) adapted to receive data from each data collection and processing device (3) for fault and maintenance monitoring purposes, characterized by the provision of a data access device (4b) associated with each data collection and processing device (4a), said data access device (4b) being accessible remotely, separately from the monitoring equipment (2) to provide a display, using a remote computer (8), of data from a selected said data collection and processing device (3) characterized in that the data access device is arranged to store data from the data collection and processing device (4a) in a format which can be utilized to generate the said display at the remote computer using an internet web browser.

2. The system according to claim 1 characterised in that there is a respective data access device (4b) for each data collection and processing device (4a).

3. The system according to claim 1 characterised in that the data access device (4b) is disposed locally to the data collection and processing device (4a).

4. The system according to claim 1 further in combination with power equipment units comprising combined heat and power (CHP) units.

5. The system at claim 4 including multiple power equipment units wherein performance data of each individual power equipment units is also monitored by the system.

* * * * *